United States Patent [19]
Huang et al.

[11] Patent Number: 5,938,230
[45] Date of Patent: Aug. 17, 1999

[54] FOLDABLE STROLLER

[75] Inventors: Ying-Yuan Huang, Chiayi; Er-Jui Chen, Kaohsiung; Pao-Shan Huang, Chiayi Hsien, all of Taiwan

[73] Assignee: Link Treasure Limited, British Virgin Islands, United Kingdom

[21] Appl. No.: 09/128,752

[22] Filed: Aug. 4, 1998

[51] Int. Cl.$^6$ ........................................... B62B 1/00
[52] U.S. Cl. ........................... 280/650; 280/642; 280/647
[58] Field of Search .................................. 280/42, 47.38, 280/658, 657, 38, 641, 642, 647, 650; 16/232

[56] References Cited

U.S. PATENT DOCUMENTS

| | | | |
|---|---|---|---|
| 2,096,550 | 8/1937 | Evron | 280/47.38 |
| 4,729,572 | 3/1988 | Bergeron | 280/650 |
| 5,388,852 | 2/1995 | Bigo et al. | 280/42 |
| 5,645,293 | 7/1997 | Cheng | 280/47.38 |
| 5,820,140 | 10/1998 | Huang | 280/30 |

*Primary Examiner*—Lanna Mai
*Assistant Examiner*—Lynda Jasmin
*Attorney, Agent, or Firm*—Thorp Reed & Armstrong, LLP

[57] ABSTRACT

A stroller includes two push handles each having a first end portion and a second end portion, a handlebar having two end portions each connected to the first end portion of one of the two corresponding push handles, two release devices each slidably and securely mounted on one of the two corresponding push handles, two first legs each having a first end portion fixedly mounted on one of the two corresponding release devices and a second end portion, two second legs each having a first end portion pivotally mounted on one of the two corresponding release devices, a mediate portion and a second end portion, and a supporting frame including two sides each having a first portion pivotally connected with the second end portion of one of the two corresponding push handles and a second portion pivotally connected with the mediate portion of one of the two corresponding second legs.

11 Claims, 7 Drawing Sheets

FOLDABLE STROLLER

FIELD OF THE INVENTION

The present invention relates to a foldable stroller, and more particularly to a foldable stroller which can be carried on the user's back.

BACKGROUND OF THE INVENTION

A conventional stroller comprises two front legs, two rear legs each pivotally connected with one of the two corresponding front legs, two push handles each secured to one of the two corresponding front legs, a substantially U-shaped handlebar connected between the two push handles, a supporting frame pivotally mounted between the front legs and the rear legs, a flexible seat mounted on the supporting frame, and a folding device for folding the front legs and the rear legs. The folding device essentially comprises a pivot hook in conjunction with locking bosses. By such an arrangement, however, the stroller cannot be folded easily by means of the engagement between the hook and the locking boss, thereby causing inconvenience when being in use. In addition, the exposed hook tends to scrape the human body, thereby easily injuring the user. Further, a shoulder strap fitted between the handlebar and the push handle can be suspended on one of the user's shoulders such that the stroller can be carried on one of the user's shoulders only when it is folded, thereby easily causing force imbalance to the user's body. The present invention has arisen to mitigate and/or obviate the disadvantage of the conventional stroller.

SUMMARY OF THE INVENTION

In accordance with one aspect of the present invention, there is provided a stroller comprising two push handles each including a first end portion and a second end portion, a handlebar including two end portions each connected to the first end portion of one of the two corresponding push handles, two release devices each slidably and securely mounted on one of the two corresponding push handles, two first legs each including a first end portion fixedly mounted on one of the two corresponding release devices and a second end portion, two second legs each including a first end portion pivotally mounted on one of the two corresponding release devices, a mediate portion and a second end portion, and a supporting frame including two sides each having a first portion pivotally connected with the second end portion of one of the two corresponding push handles and a second portion pivotally connected with the mediate portion of one of the two corresponding second legs.

Further benefits and advantages of the present invention will become apparent after a careful reading of the detailed description with appropriate reference to the accompanying drawings.

DETAILED DESCRIPTION OF THE PREFERRED EMBODIMENTS

Referring to the drawings and initially to FIGS. 1–4, a foldable stroller 1 in accordance with the present invention comprises two push handles 13 each including a first end portion and a second end portion, a substantially inverted U-shaped handlebar 14 including two end portions each connected to the first end portion of one of the two corresponding push handles 13, two release devices 30 each slidably and securely mounted on one of the two corresponding push handles 13, two first or front legs 11 each including a first end portion fixedly mounted to one of the two corresponding release devices 30 and a second end portion, two second or rear legs 12 each including a first end portion pivotally mounted to one of the two corresponding release devices 30, a mediate portion and a second end portion, and a supporting frame 15 including two sides each having a first portion pivotally connected with the second end portion of one of the two corresponding push handles 13 and a second portion pivotally connected with the mediate portion of one of the two corresponding second legs 12.

Figure 1:
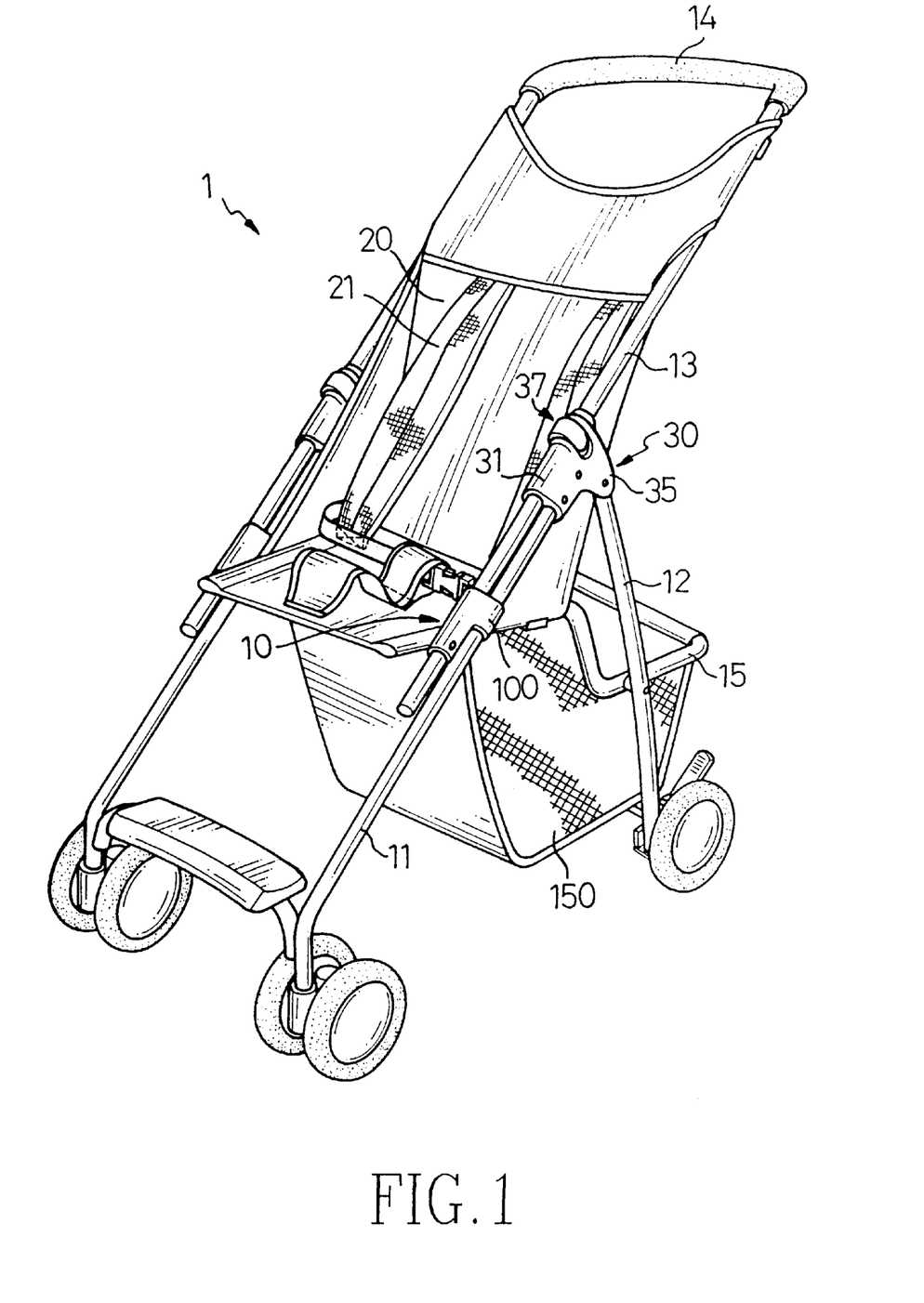
FIG. 1 is a perspective view of a foldable stroller in accordance with the present invention.

The foldable stroller 1 further comprises a basket 150 mounted on the supporting frame 15, a seat 20 made of flexible material mounted between the two push handles 13, and two shoulder straps 21 each attached to the seat 20. Preferably, the seat 20 is made of cloth.

The foldable stroller 1 further comprises two coupling devices 10 each fixedly mounted on the second end portion of one of the two corresponding push handles 13 and each laterally formed with an extension 100 containing a guiding channel 103 through which each of the two first legs 11 can slidably extend. Each of the two coupling devices 10 longitudinally contains a passage 101 for receiving the second end portion of one of the two corresponding push handles 13 therein, and the stroller further comprises two positioning members 102 each extending through one of the two corresponding coupling devices 10 and the second end portion of the respective push handle 13 such that each of the two coupling devices 10 can be secured to the corresponding push handle 13.

Figure 6:
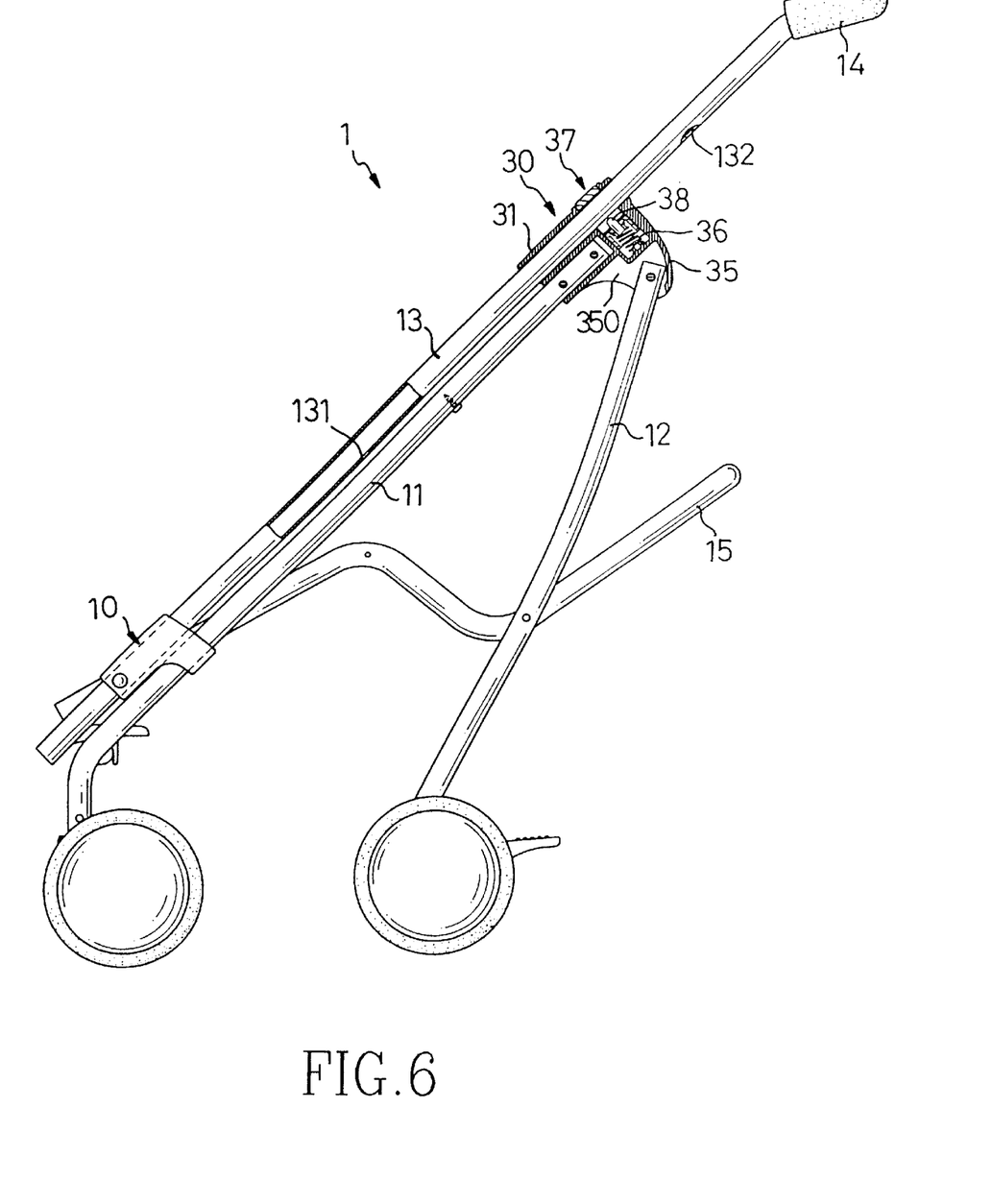
FIG. 6 is an operational view of the stroller as shown in FIG. 2.

Each of the two push handles 13 transversely contains a first locking cavity 131 in the mediate portion thereof and a second locking cavity 132 in the second end portion thereof as best shown in FIG. 6.

Figure 3:
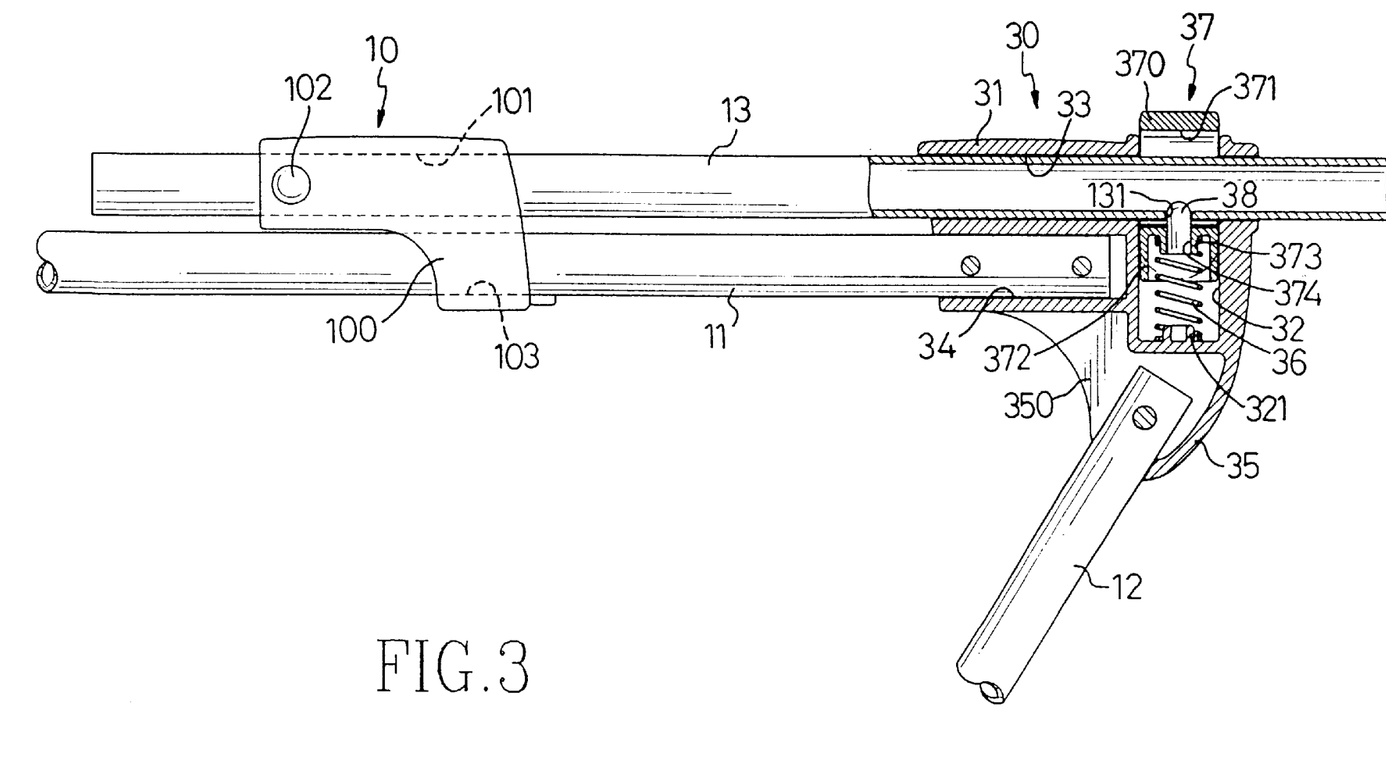
FIG. 3 is a side plan cross-sectional view of the release device of the stroller as shown in FIG. 1.
Figure 4:
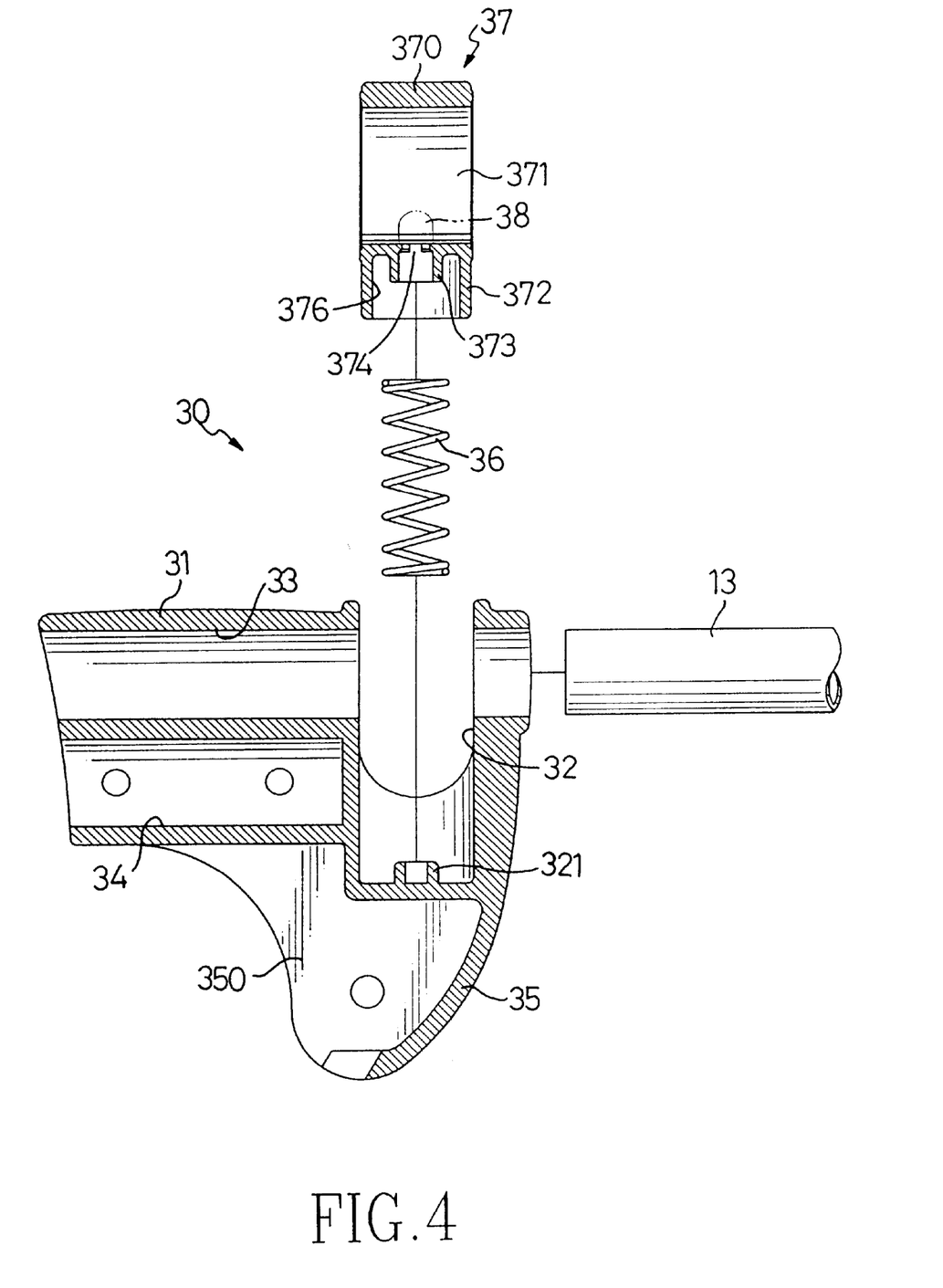
FIG. 4 is an exploded view of the release device as shown in FIG. 3.

Each of the two release devices 30 comprises a body 31 slidably mounted on one of the two corresponding push handles 13 and longitudinally containing an elongated guiding passage 33 for the passage of the respective push handle 13, and transversely containing a receiving recess 32 open to the guiding passage 33, a push button 37 slidably received in the receiving recess 32 and including a first portion 370 containing an elongated slot 371 open to the guiding passage 33 for slidably receiving one of the two corresponding push handles 13 therein, and a second portion 372, and a locking stub 38 fixedly mounted on the second portion 372 of the push button 37 to move therewith and capable of being detachably received in the first locking cavity 131 of one of the two corresponding push handles 13.

The body 31 includes a first retaining stud 321 located in the receiving recess 32 thereof, and the second portion 372 of the push button 37 contains a receiving space 376 and includes a second retaining stud 373 located in the receiving space 376. Each of the two release devices 30 further comprises a biasing member 36 mounted between the push button 37 and the body 31 and including a first end portion secured to the first retaining stud 321 and a second end portion secured to the second retaining stud 373.

The second retaining stud 373 of the push button 37 contains a retaining opening 374 open to the elongated slot 371 and capable of aligning with the first locking cavity 131, and the locking stub 38 is fixedly fitted in the retaining opening 374 of the second retaining stud 373.

The body 31 of each of the two release devices 30 further longitudinally contains a positioning recess 34 juxtaposed with the guiding passage 33, and the first end portion of each of the two first legs 11 is fixedly received in the positioning recess 34 of the body 31 of one of the two corresponding release devices 30.

Each of the two release devices 30 further comprises an extension ear 35 extending outward from the body 31 and containing a pivot space 350 therein such that the first end portion of each of the two second legs 12 can be pivotally received in the pivot space 350 of the extension ear 35 of one of the two corresponding release devices 30.

Figure 2:
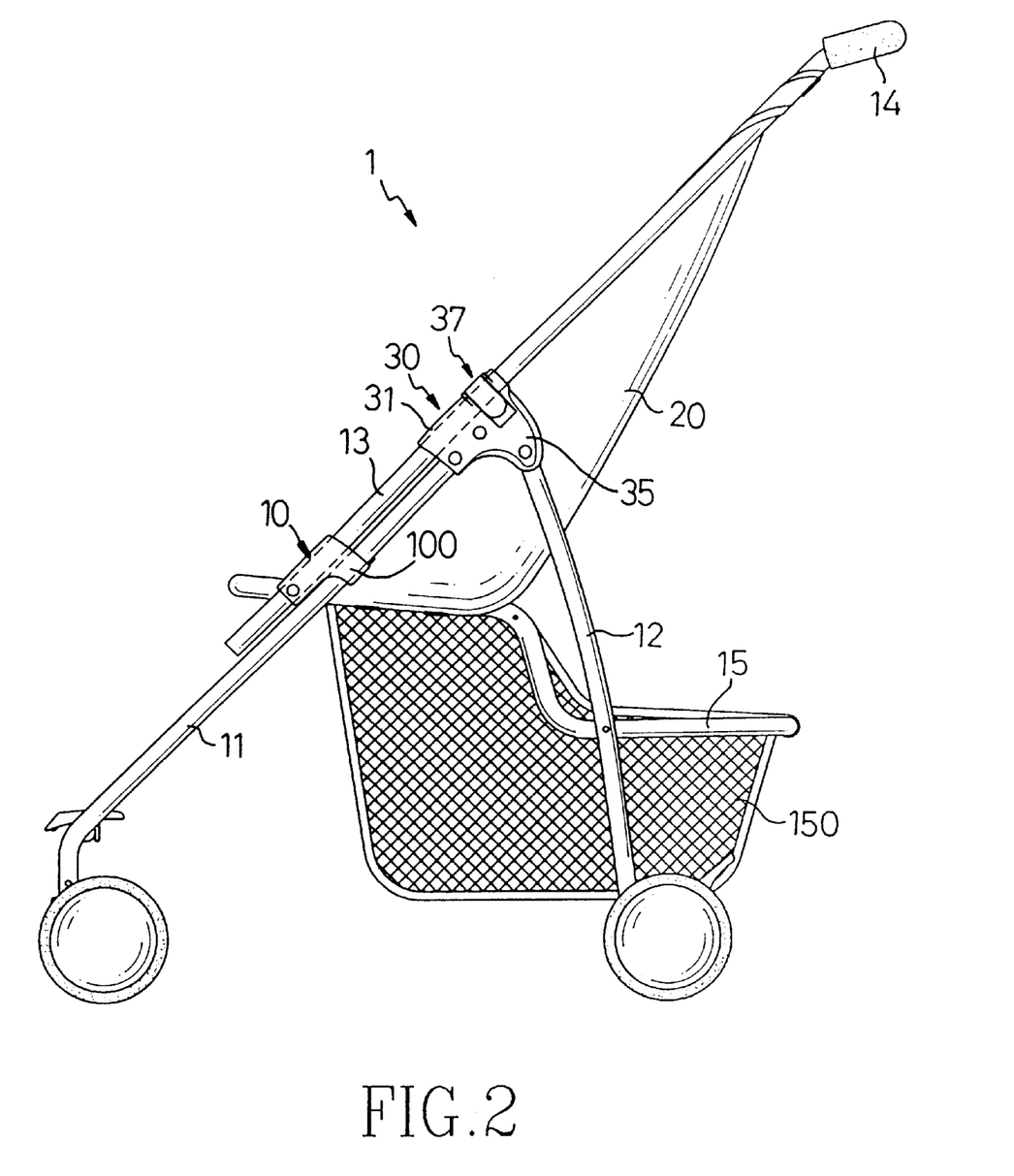
FIG. 2 is a side plan view of the foldable stroller as shown in FIG. 1.

In operation, referring now to FIGS. 3–7 with reference to FIGS. 1 and 2, the locking stub 38 of each of the two release devices 30 is initially received in the first locking cavity 131 of the corresponding push handle 13 as shown in FIG. 3 such that each of the two release devices 30 together with the respective first leg 11 can be secured to the corresponding push handle 13.

Figure 5:
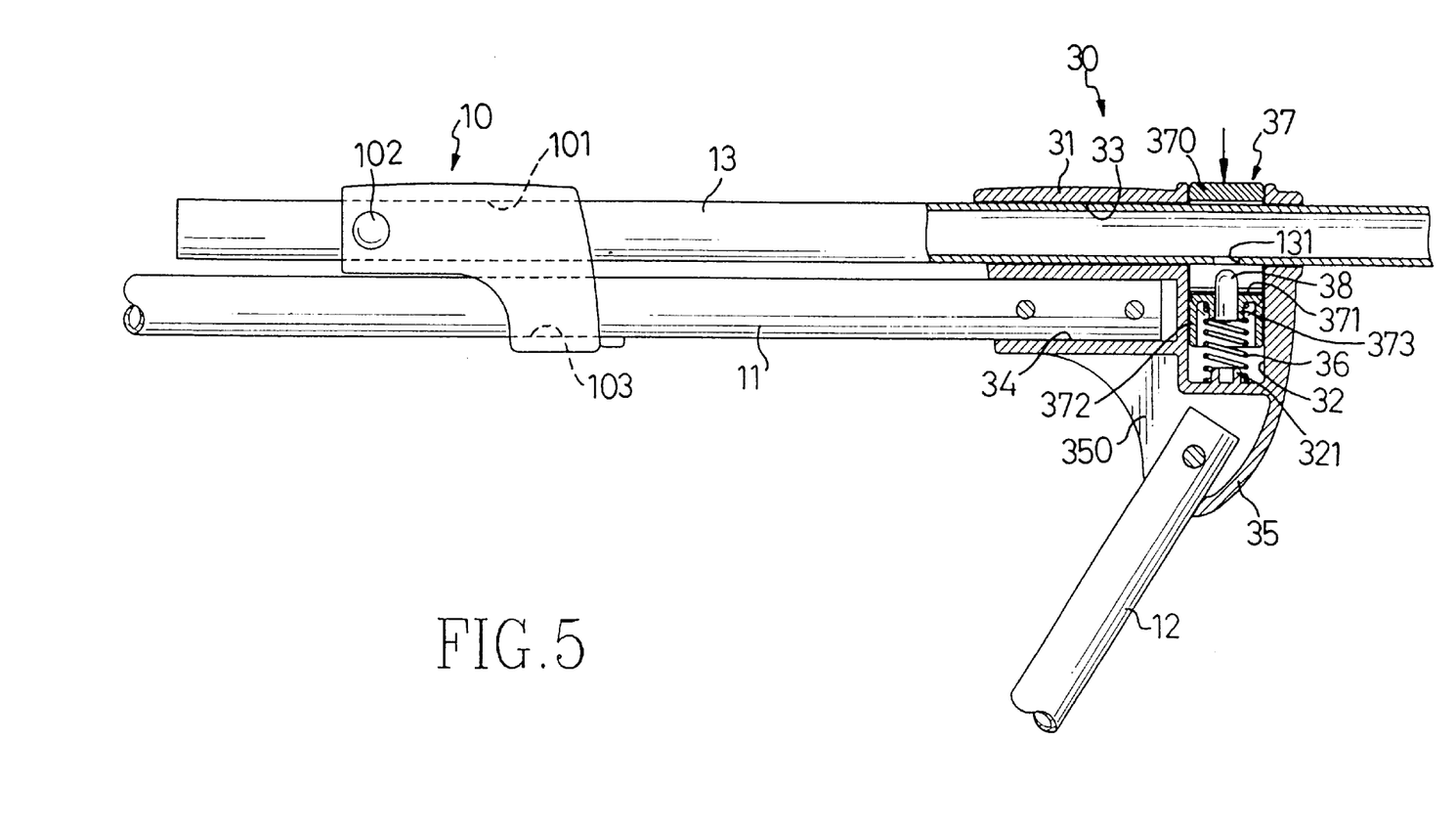
FIG. 5 is an operational view of the release device as shown in FIG. 3.

The push button 37 of each of the two release devices 30 can then be pressed into the receiving recess 32 of the body 31 from the position as shown in FIG. 3 to the position as shown in FIG. 5, thereby detaching the locking stub 38 from the locking cavity 131 such that each of the two release devices 30 together with the respective first leg 11 can be moved upward along the corresponding push handle 13 to the position as shown in FIG. 6, thereby pivoting the supporting frame 15 and each of the two second legs 12 relative to the corresponding push handles 13 from the position as shown in FIG. 2 to the position as shown in FIG. 6.

Figure 7:
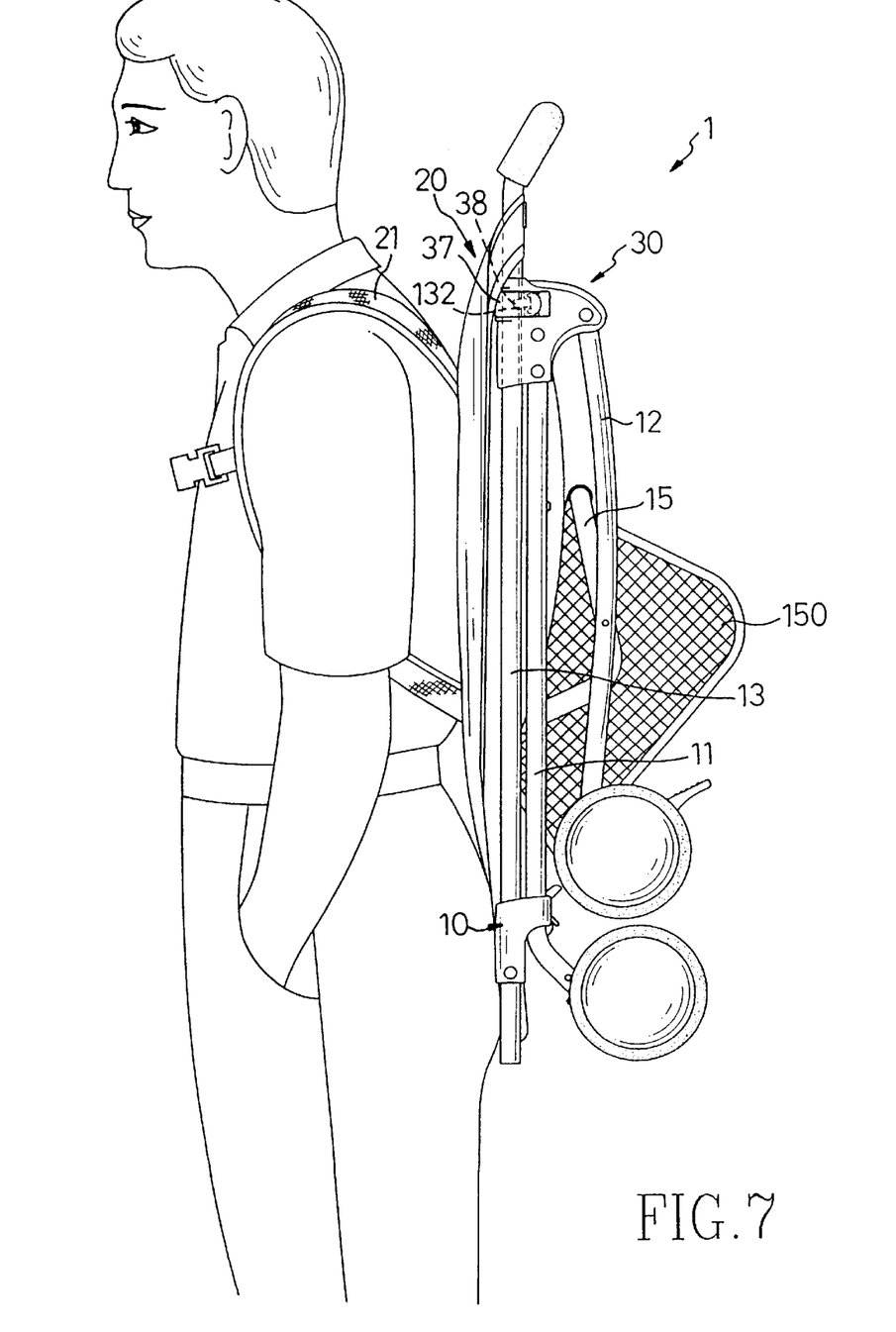
FIG. 7 is a further operational view of the stroller as shown in FIG. 2, wherein the stroller is disposed in a fully folded status.

Each of the two release devices 30 together with the respective first leg 11 can be further moved upward along the corresponding push handle 13 to the position as shown in FIG. 7 where the locking stub 38 aligns with and can be received into the second locking cavity 132 of the corresponding push handle 13 such that each of the two release devices 30 together with the respective first leg 11 can be secured to the corresponding push handle 13 again by means of the returning force of the biasing member 36 so as to further pivot the supporting frame 15 together with each of the two second legs 12 to be juxtaposed to the corresponding push handles 13, thereby entirely folding the stroller 1 as shown in FIG. 7.

By such an arrangement, the stroller 1 can be expanded or collapsed easily by means of pressing the push button of each of the two release devices 30, thereby making it easier for the user to manipulate the stroller 1. In addition, each of the two shoulder straps 21 can be placed on the user's shoulders when the stroller 1 is folded such that the stroller 1 can be carried on his back, thereby greatly facilitating the user carrying the stroller 1. Further, the locking stub 38 is hidden in each of the two release devices 30, thereby preventing the locking stub 38 from hooking the clothes when the user carries the stroller 1 on his back.

It should be clear to those skilled in the art that further embodiments may be made without departing from the scope and spirit of the present invention.

What is claimed is:

1. A stroller comprising:

two push handles each including a first end portion and a second end portion, and each transversely containing a locking cavity therein;

a handlebar including two end portions each connected to said first end portion of each of said two corresponding push handles;

two release devices each slidably securely mounted on each of said two corresponding push handles, each of said two release devices including:

a body slidably mounted on each of said two push handles and longitudinally containing an elongated guiding passage for passage of said push handle, and transversely containing a receiving recess open to said guiding passage;

a push button slidably received in said receiving recess and having a first portion and a second portion, said first portion containing an elongated slot open to said guiding passage for slidably receiving each of said two corresponding push handles therein; and a locking stub fixedly mounted on said second portion of said push button to move therewith and detachably received in said locking cavity of each said two corresponding push handles;

two first legs each including a first end portion fixedly mounted on each of said two corresponding release devices and a second end portion;

two, second legs each including a first end portion pivotally mounted on each of said two corresponding release devices, a mediate portion and a second end portion; and a supporting frame including two sides each having a first portion pivotally connected with said second portion of each of said two corresponding push handles and a second portion pivotally connected with said mediate portion of each of said two corresponding second legs.

2. The stroller in accordance with claim 1, further comprising two coupling devices each fixedly mounted on said second end portion of each of said two corresponding push handles and each laterally formed with an extension containing a guiding channel for slidably receiving each of said two first legs therein.

3. The stroller in accordance with claim 2, wherein each of said coupling devices longitudinally contains a passage for receiving said second end portion of each of said two corresponding push handles, and said stroller further comprises two positioning members each extending through each of said two corresponding coupling devices and said second end portion of said respective push handles.

4. The stroller in accordance with claim 1, wherein said body includes a first retaining stud located in the receiving recess thereof, said second portion of said push button contains a receiving space and includes a second retaining stud located in said receiving space, and each of said two release devices further comprises a biasing member mounted between said push button and said and including a first end portion secured to said first retaining stud and a second end portion secured to said second retaining stud.

5. The stroller in accordance with claim 4, wherein said second retaining stud of said push button contains a retaining opening open to said elongated slot and aligning with said locking cavity, and said locking stub is fixedly fitted in said retaining opening.

6. The stroller in accordance with claim 1, wherein said body of each of said two release devices further longitudinally contains a positioning recess juxtaposed to said guiding passage, and said first end portion of each of said two first legs is fixedly received in said positioning recess of said body of each of said two corresponding release devices.

7. The stroller in accordance with claim 1, wherein each of said two release devices includes an extension ear extending outward from said body and containing a pivot space therein, and said first end portion of each of said two second legs is pivotally received in said pivot space of said extension ear of each of said two corresponding release devices.

8. The stroller in accordance with claim 1, further comprising an article receiving basket mounted on said supporting frame.

9. The stroller in accordance with claim 1, further comprising a supporting seat made of flexible material mounted between said two push handles.

10. The stroller in accordance with claim 9, wherein said supporting seat is made of cloth.

11. The stroller in accordance with claim 9, further comprising two shoulder straps each attached to said supporting seat.

* * * * *